June 2, 1970  W. HOVERMAN, JR  3,514,916
SEALING STRIP

Filed May 29, 1969  5 Sheets-Sheet 1

INVENTOR.
WILLIAM HOVERMAN, JR.
BY
ATTORNEY

June 2, 1970  W. HOVERMAN, JR  3,514,916
SEALING STRIP

Filed May 29, 1969  5 Sheets-Sheet 2

INVENTOR.
WILLIAM HOVERMAN, JR.
BY
ATTORNEY

June 2, 1970  W. HOVERMAN, JR  3,514,916
SEALING STRIP

Filed May 29, 1969  5 Sheets-Sheet 3

INVENTOR.
WILLIAM HOVERMAN, JR.
BY
ATTORNEY

INVENTOR.
WILLIAM HOVERMAN, JR.
BY
ATTORNEY

June 2, 1970  W. HOVERMAN, JR  3,514,916
SEALING STRIP
Filed May 29, 1969  5 Sheets-Sheet 5
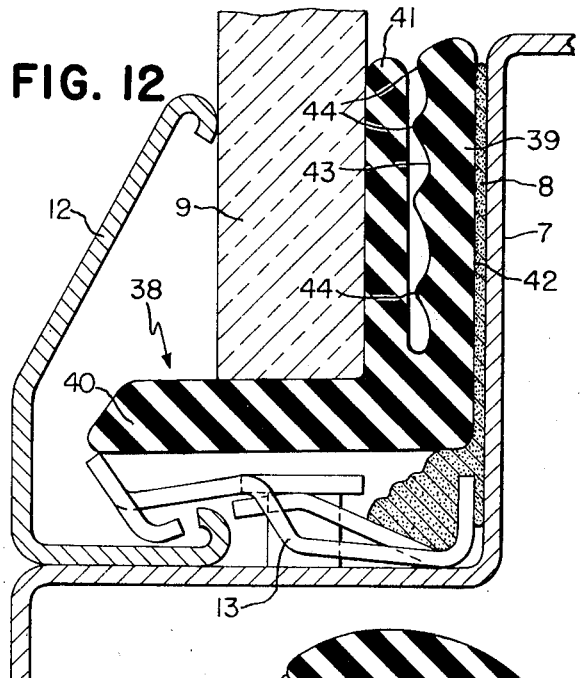
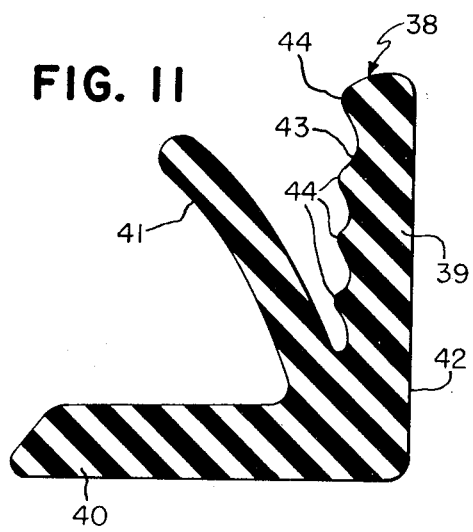
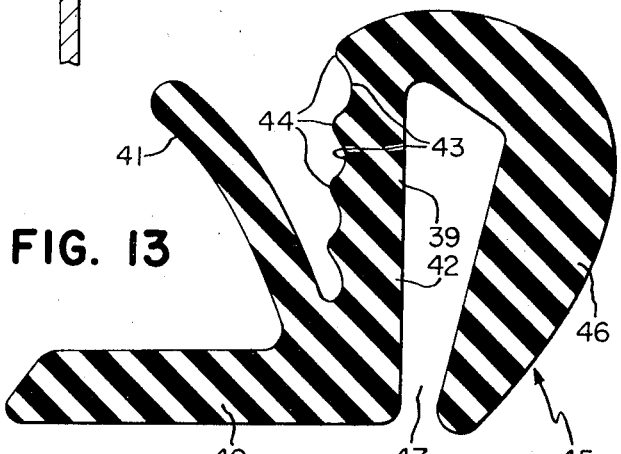
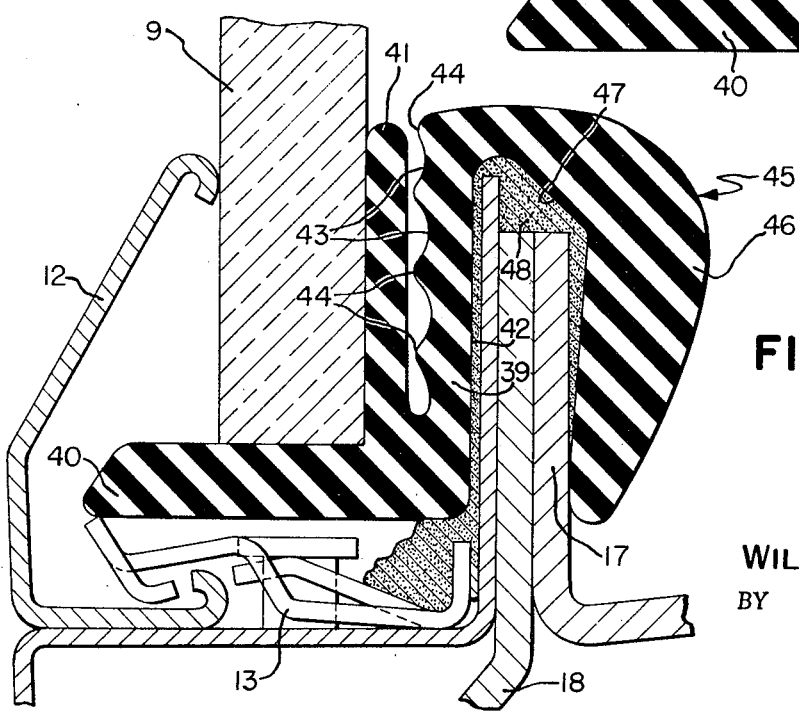
INVENTOR.
WILLIAM HOVERMAN, JR.
BY
ATTORNEY

United States Patent Office 3,514,916
Patented June 2, 1970

3,514,916
SEALING STRIP
William Hoverman, Jr., Wapakoneta, Ohio, assignor to The Goodyear Tire & Rubber Company, Akron, Ohio, a corporation of Ohio
Continuation-in-part of application Ser. No. 717,238, Mar. 29, 1968. This application May 29, 1969, Ser. No. 830,926
Int. Cl. E04b 1/62; E06b 3/62; B32b 3/04
U.S. Cl. 52—400      11 Claims

ABSTRACT OF THE DISCLOSURE

A sealing strip of elastomeric material for mounting glass panes in window openings such as those in automotive vehicles. The sealing strip is an elongated member of uniform cross section having an intermediate portion, a base portion integral with one edge of the intermediate portion, and a resilient windowpane sealing lip integral with the intermediate portion with both the base portion and the resilient sealing lip extending laterally outwardly from the outer side of the intermediate portion. In order to prevent the sealing lip from sticking to the intermediate portion, the intermediate portion is provided with either a series of longitudinal ribs or corrugations or with an auxiliary lip similar to the sealing lip. An additional lip may be provided on the inner side of the intermediate portion to define a channel for receiving a pinch weld or a portion of the window frame. When the windowpane is pressed into position against the seal strip, it bends the windowpane sealing lip inwardly against the intermediate portion, and the pressure of the lip against the windowpane creates a leak-proof seal. A trim strip holds the windowpane against the seal strip.

CROSS-REFERENCE TO RELATED APPLICATIONS

This is a continuation-in-part of my copending application, Ser. No. 717,238 filed Mar. 29, 1968, now abandoned.

This invention relates to a seal strip for mounting windowpanes in window frames of automotive vehicles and the like to create a leak-proof seal around the edge of the windowpane and the window frame.

PRIOR ART

In the prior art, many different types of seal strips have been devised for sealingly mounting windowpanes in window frames of automotive vehicles and other structures. In most cases, all of these seal strips have contained a windowpane receiving channel in which the marginal edge of a windowpane is sealingly gripped between a pair of opposed lips contacting each side of the windowpane. In many instances, a second channel facing in the opposite direction from the windowpane receiving channel is provided to sealingly grip the window frame or pinch weld section of an automotive vehicle. A typical example of such a sealing strip may be found in my previously issued Pat. No. 3,338,015. The prior art reveals a multitude of seal strips of this same general type, each one having certain individual characteristics of contour or mechanical design features which makes it patentably distinct. One of the difficulties with the sealing strips shown in the prior art is that it is not always easy to insert the windowpane in the windowpane receiving channel, and this is particularly true if one attempts to insert the windowpane into the seal strip after the seal strip has been placed in the window frame. In order to mount the window pane in this way, the outer lip of the windowpane receiving channel must be bent outwardly along its length to permit insertion of the windowpane. This is a very difficult and time-consuming operation to perform. It may be seen that elimination of the outer lip would make it possible to insert the windowpane in the seal strip much more easily. If the outer lip is to be eliminated, however, a substitute sealing means must be provided between the windowpane and the seal strip.

OBJECTS OF THE INVENTION

It is the primary object of this invention to improve upon the prior art devices by providing a seal strip in which the windowpane receiving channel and the outer lip thereof are eliminated to simplify the assembly of the windowpane with the seal strip.

Another object of this invention is to provide a seal strip which is simple in contour and inexpensive to produce.

A still further object of this invention is to provide a seal strip which creates a positive seal between the windowpane and the seal strip without the need of using sealant compounds between the seal strip and the windowpane.

These and other objects of the invention will become more fully apparent as the description proceeds in the following specification and the appended drawings.

BRIEF DESCRIPTION OF THE DRAWINGS

In the drawings:

FIG. 11 is a cross-sectional view of another embodiment of the invention with the seal strip in its normal unstressed position;

FIG. 12 shows the strip of FIG. 11 after assembly with a pane of glass in a window opening;

FIG. 13 is a cross-sectional view of another embodiment similar to that shown in FIG. 11, but with a window frame receiving channel; and FIG. 14 shows the strip of FIG. 13 after assembly with a pane of glass in a window opening.

DESCRIPTION OF THE PREFERRED EMBODIMENTS

Figure 1:
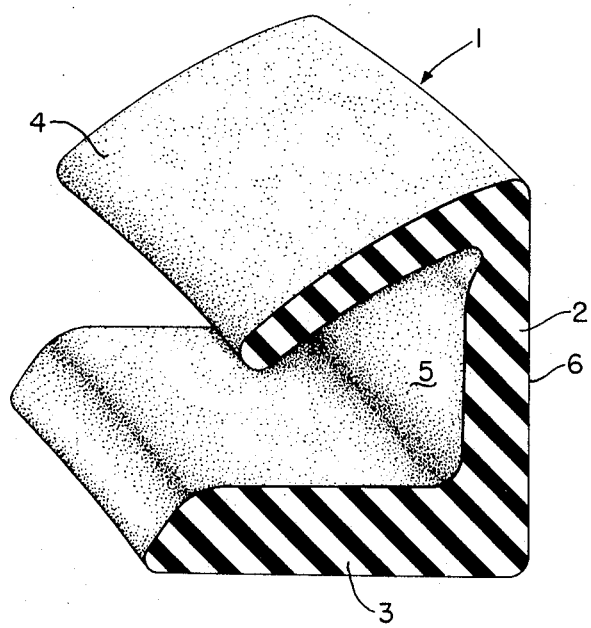
FIG. 1 is a cross-sectional view in perspective of a sealing strip in its normal unstressed shape prior to assembly with a windshield mounted in a vehicle opening.
Figure 2:
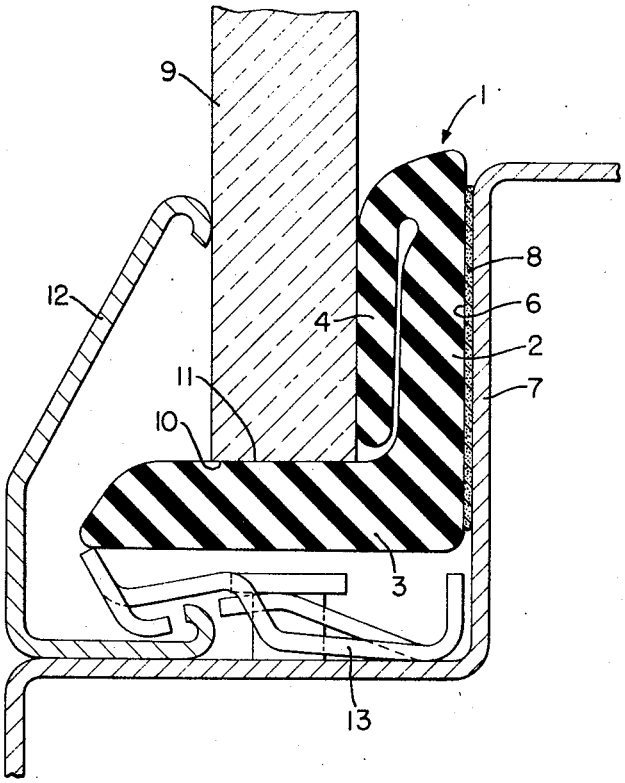
FIG. 2 shows a section of the seal strip of FIG. 1 after assembly and connecting the marginal edges of a pane of glass to the marginal edge of a sheet metal support such as a window opening in an automotive vehicle with a trim strip holding the glass pane in position against the seal strip.

Referring now more specifically to the drawings and in particular, to FIGS. 1 and 2, the numeral 1 indicates generally the sealing strip or body portion of the invention. For the purposes of illustrating the invention, a windshield is shown in FIG. 2 mounted in the seal strip. However, rear decks or other windows or panels may also use the seal strip. The cross-section of the sealing strip 1 is of a contour which resembles a modified "U" shape with one of the sides being inclined at an angle with respect to the other. The seal strip 1 is preferably an extrusion of resilient elastomeric material such as rubber or the like. It may, however, be molded, cast or made by any other suitable manufacturing method. The seal strip 1 has a continuous longitudinal intermediate portion 2 which has an integral base portion 3 extending from one side thereof and a resilient bendable windowpane seal lip 4 extending from the same side of the intermediate portion 2 as the base 3 but extending from the opposite marginal edge thereof. The base 3 and the lip 4 extend from the outer side 5 of the intermediate portion 2 which lies adjacent the windowpane when it is placed in position against the seal strip 1. The inner side 6 of the intermediate portion 2 faces inwardly and lies against a portion of the window frame 7 as shown in FIG. 2.

In FIG. 2, the seal strip 1 is shown mounted in assembled position in the window frame 7 with the inner side 6 being attached to the frame 7 by an adhesive layer 8 which may also serve as a sealant. A windowpane 9 is placed in position against the seal strip 1 in such manner that the marginal edge 10 of the windowpane 9 rests against a surface 11 of the base portion 3 with the base portion 3 contacting the entire peripheral edge of the windowpane 9. It serves as a protective cushioning member to prevent vibration or cracking of the windowpane 9 and to prevent it from shifting laterally in the window frame. When the windowpane 9 is placed in assembled position against the seal strip 1, the sealing lip 4 is bent inwardly from its laterally extended position to lie substantially parallel to the intermediate portion 2, and in some instances, may be compressed between the windowpane 9 and the intermediate portion 2. Regardless of whether or not the sealing lip 4 is compressed between the intermediate portion 2 and the windowpane 9, the resiliency of the lip 4 will cause the lip to bear against the inner surface of the windowpane 9 along its marginal edge and create a leak-proof seal between the windowpane 9 and the seal strip 1. If it is desired to do so, a strip of sealant compound or adhesive may be used between the windowpane 9 and the lip 4; however, it is normally not necessary to use any compound or adhesive between these two parts since the pressure of the lip 4 on the windowpane 9 will normally create a satisfactory seal. A trim strip 12, locked in position on the window frame 7 by a plurality of conventional clips 13, bears against the outer surface of the windowpane and holds in sealing engagement with the seal strip 1.

Figure 3:
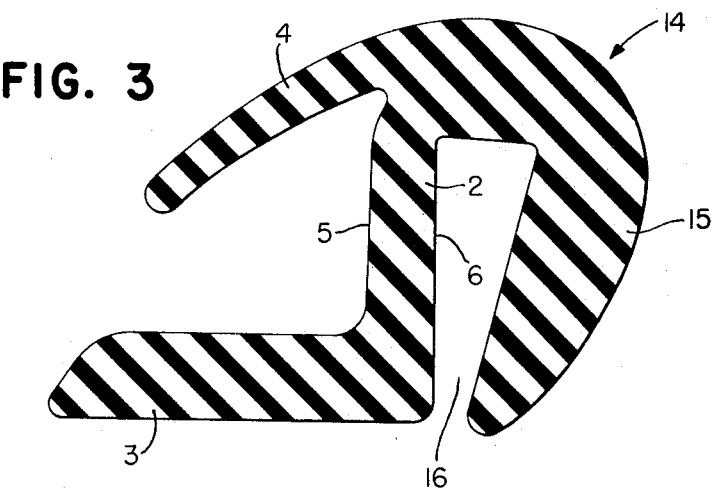
FIG. 3 shows a cross-section of another embodiment of the seal strip in its normal unstressed position.
Figure 4:
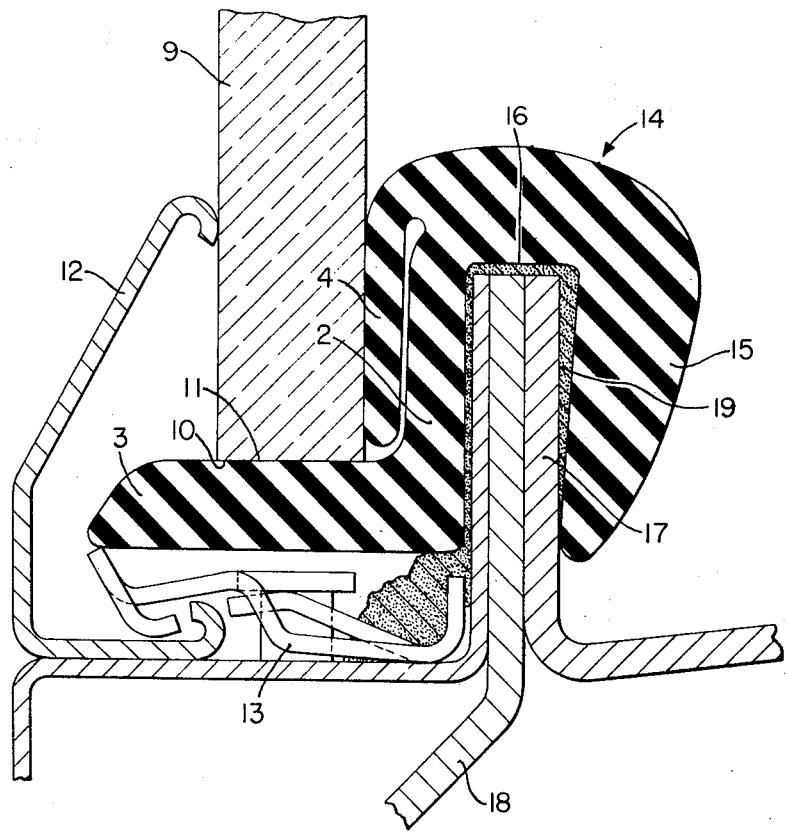
FIG. 4 shows the strip of FIG. 3 after assembly with a pane of glass in a window opening and with a trim strip holding the glass pane against the seal strip.

The embodiment shown in FIG. 3 shows a sealing strip 14 which is substantially identical to the sealing strip 1 shown in FIG. 1 except that it has an additional inner lip 15 integral with the intermediate portion 2 and extending from the opposite side thereof from the sealing lip 4. The lip 15 is spaced from the inner side 6 of the intermediate portion 2 to define a windowpane receiving channel 16 to receive a pinch weld section 17 of a window frame indicated generally by the numeral 18 as shown in FIG. 4. For simplicity, the parts of the embodiments of FIGS. 3 and 4 which are identical to the parts of the embodiments shown in FIGS. 1 and 2 will bear the same numerals, and it will be understood that the manner in which the windowpane 9 seals against the lip 4 in FIG. 4 is identical to the sealing action described previously in FIG. 2. Also, a similar trim strip 12 retained by a clamp 13 holds the windowpane 9 against the seal strip 14 in the same manner as the sealing strip 1 described in FIG. 2. When the pinch weld 17 is inserted in the channel 16, it may be desirable to use a sealant compound or resilient sealing material 19 to provide an additional seal between the pinch weld 17 and the sealing strip 14. In addition to the trim strip 12, it may be desirable to use additional clips (not shown) located inside the trim strip and attached to the window frame to bear against the windowpane 9 and hold it against the sealing lip 4.

Although the embodiments shown in FIGS. 1 through 4 provide a satisfactory seal in many instances, there are times when due to the nature of the elastomeric material used, the sealing lip 4, when compressed against the intermediate portion 2, will sometimes adhere to the intermediate portion. When this occurs, if the glass shifts outwardly away from the sealing lip 4, the lip 4 may be at least partially restrained by the adhesion with the intermediate portion 2 and will, therefore, not exert the sealing pressure against the windowpane 9 in the manner necessary to provide a proper seal with the glass pane. To assure that such adhesion does not occur between the sealing lip 4 and the intermediate portion 2, various means may be employed as illustrated in FIGS. 5 through 14.

Figure 5:
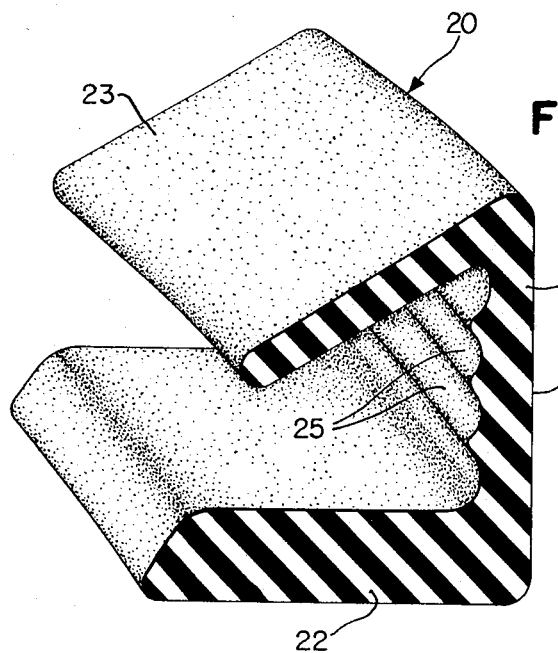
FIG. 5 is a cross-sectional view in perspective of another embodiment of the seal strip in its normal unstressed position.
Figure 6:
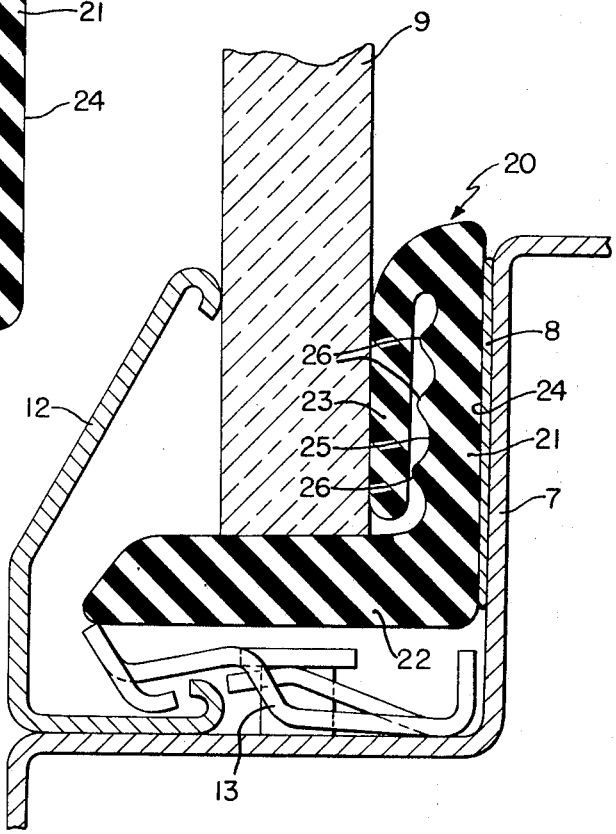
FIG. 6 shows the strip of FIG. 5 after assembly with a pane of glass in a window opening.

Referring now to the embodiment shown in FIGS. 5 and 6, the numeral 20 is used to indicate the seal strip. For the purpose of simplicity, the same numerals as those used in the previous figures will be used to illustrate the trim strip, the retaining clips, the window frame and the windowpane. The sealing strip 20 has an intermediate portion 21 with an integral base portion 22 extending laterally from one edge thereof and a flexible bendable sealing lip 23 extending laterally from the opposite edge thereof, but inclined at an acute angle to both the intermediate portion 21 and the base portion 22. The sealing lip 23 is preferably straight in cross-sectional contour or may be slightly concavely curved on the side which will contact the windowpane. The use of a straight sealing lip or one with a slight concave curvature provides better sealing contact with the windowpane. Such contour compensates for the change in curvature brought about by the bending of the sealing lip when the windowpane is positioned against the lip. The intermediate portion 21 has a flat inner surface 24 which is adhered to the window frame 7 by a suitable adhesive 8. The outer surface 25 of the intermediate portion has a plurality of longitudinal ribs or corrugations 26 which provide an irregular surface for contact with the sealing lip 23 when it is compressed against the intermediate portion by the glass pane 9. Since only the high points of the ribs 26 are in contact with the sealing lip 23, there is insufficient surface contact to cause adhesion between the sealing lip 23 and the intermediate portion 21. By eliminating the adhesion problem in this area, the sealing lip 23 will always follow any lateral shifting of the windowpane 9 and will maintain a constant pressure against the inner surface of the windowpane and thereby create a leak-proof seal at all times. It will, of course, be understood that the embodiment shown in FIGS. 5 and 6 may be modified to provide a windowpane receiving channel, such as the channel 16 in FIGS. 3 through 4 merely by adding an inner lip similar to the lip 15 shown in FIGS. 3 and 4. For the purpose of simplicity, additional figures will not be shown to illustrate this additional embodiment since it can be readily visualized by combining the lip 15 of FIGS. 3 and 4 with the embodiments shown in FIGS. 5 and 6.

Figure 7:
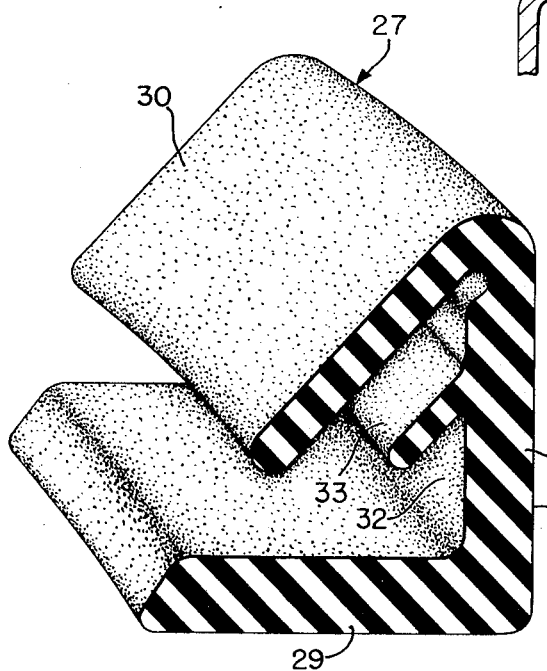
FIG. 7 shows a cross-sectional view of another embodiment of the invention.
Figure 8:
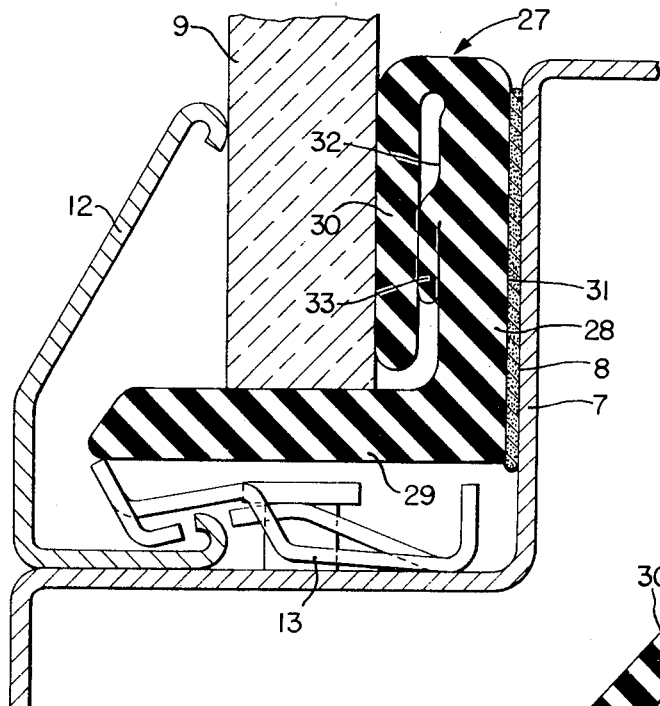
FIG. 8 shows the strip of FIG. 7 after assembly with a pane of glass in a window opening.

Referring now to FIGS. 7 and 8, a sealing strip is indicated as a whole by the numeral 27. The strip 27 has an intermediate portion 28 with an integral base portion 29 extending laterally outwardly from one edge thereof and a flexible sealing lip 30 extending laterally outwardly from the opposite edge thereof but inclined at an acute angle to both the intermediate portion 28 and the base portion 29. The sealing lip 30 has a substantially straight cross-sectional contour similar to the lip 23 previously described in FIGS. 5 and 6. The reason for the particular cross-sectional contour of the lip 30 is the same as that described with regard to the lip 23. In other words, the contour of the lip 30 is designed to compensate for bending of the lip caused by pressure of the glass pane positioned against the lip when in the assembled position. The intermediate portion 28 has an inner flat surface 31 which is adhered to the window frame member 7 by a suitable adhesive 8. The outer surface 32 of the intermediate portion 28 has an integral auxiliary lip 33 extending laterally outwardly therefrom at a similar angle to that of the lip 30 when the sealing strip 27 is in the unstressed position prior to assembly with a windowpane 9 as shown in FIG. 8. The auxiliary lip 33 serves a similar function to the ribs 26 shown in FIGS. 5 and 6 by preventing adhesion between the sealing lip 30 and the intermediate portion 28. In addition, the auxiliary lip 33 exerts an auxiliary outward pressure against the lip 30 tending to force it more firmly against the windowpane 9 when in the assembled position as shown in FIG. 8 and thereby providing a tighter seal between the sealing lip 30 and the windowpane 9. It will be understood that more than one auxiliary lip may be used if necessary; however, in the preferred embodiment, one auxiliary lip appears to adequately perform the desired function.

Figure 9:
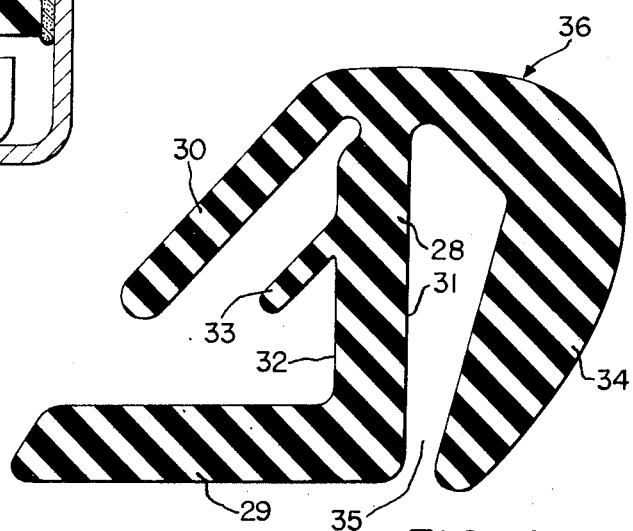
FIG. 9 is a cross-sectional view of another embodiment similar to that shown in FIG. 7, but with a window frame receiving channel.
Figure 10:
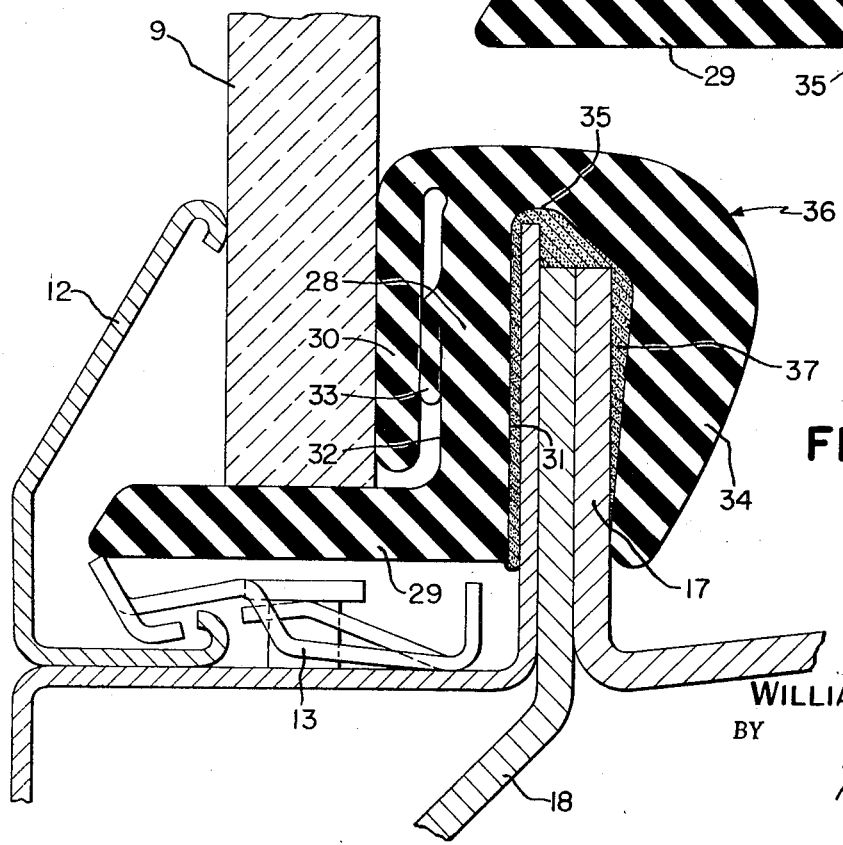
FIG. 10 shows the strip of FIG. 9 after assembly with a windowpane in a window opening.

FIGS. 9 and 10 will not be described in great detail in the interest of brevity since the embodiments shown in these two figures are essentially the same as that shown in FIGS. 7 and 8 with the addition of an inner lip 34 for the purpose of creating a window frame receiving channel 35 between the lip 34 and the intermediate portion 28. For the purpose of this discussion, the seal strip shown in FIGS. 9 and 10 will be identified by the numeral 36. The portions of this embodiment which are identical to that shown in the seal strip of FIGS. 7 and 8 will be identified with identical numerals. The sealing lip 30 and the auxiliary sealing lip 33 functions in an identical manner in FIGS. 9 and 10 as that described in FIGS. 7 and 8. The only difference in these two embodiments is that as shown in FIG. 10, the sealing strip 36 fits over a pinch weld 17 of a window frame 18 and the channel 35 is filled with sealing compound 37 to seal and adhere the strip 36 to the window frame.

Referring now to FIGS. 11 and 12, a sealing strip is indicated by the numeral 38. The strip 38 has an intermediate portion 39 which has an integral base portion 40 extending laterally outwardly from one edge thereof and a flexible bendable sealing lip 41 extending outwardly from the juncture of the intermediate portion 39 and the base portion 40 with the sealing lip 41 being inclined at an acute angle to both the intermediate portion 39 and the base 40. The sealing lip 41 has a slight concave curvature on the side which contacts the windowpane 9 when it is in assembled position as shown in FIG. 12. The purpose of this curvature is to compensate for the bending of the lip 41. The intermediate portion 39 has a flat inner surface 42 which is adhered to the window frame 7 by a suitable adhesive 8. The intermediate portion 39 has an outer surface 43 which has a plurality of ribs or corrugations 44 which function in the same manner as the ribs 26 previously described in the description of FIGS. 5 and 6. In other words, the ribs 44 prevent adhesion of the sealing lip 41 to the intermediate portion 39 by limiting the amount of surface contact therebetween. There is a certain advantage to connecting the sealing lip 41 to the juncture of the intermediate portion 39 and the base portion 40. This configuration provides a greater amount of surface contact with the windowpane 9 in a situation where the marginal edge of the windowpane 9 does not extend to the base portion 40 as shown in FIG. 12, but terminates short of the base portion. In this situation, the sealing lip shown in FIGS. 11 and 12 would provide a greater area of surface contact with the windowpane than would be provided by the sealing lip extending from the opposite edge of the intermediate portion as it does in FIGS. 1 through 10.

FIGS. 13 and 14 show a sealing strip 45 with essentially the same configuration as the sealing strip 38 shown in FIGS. 11 and 12 but with the addition of an inner lip 46 which provides a window frame receiving channel 47 between the lip 46 and the intermediate portion 39. The channel 47 is filled with sealant 48 to provide a leak-proof seal between the sealing strip 45 and the pinch weld 17. All the parts in FIGS. 13 and 14 which are similar to those in FIGS. 11 and 12 bear similar numerals and the function of these two embodiments is essentially the same. The only difference between them is the manner of mounting the sealing strip in the window frame.

In certain types of windows, a combination of the sealing strips shown in FIG. 1 and FIG. 3 may be used. For example, the strip 1 shown in FIG. 1 may be used across the bottom of a window and the strip 14 shown in FIG. 3 may be used at the top and sides of the window. Similarly, the various embodiments shown in FIGS. 5 through 14 may be used in various combinations with each other and with the embodiments of FIGS. 1 through 4.

It should be understood at this point that the contour of the base member 3 may be varied in a great number of ways to accommodate the particular contour of the window frame in which the sealing strip 1 is to be used. For example, the base member 1 may be tapered from a thicker to a thinner cross section. It may be stepped to fit a stepped portion in the window frame, or it may contain ribs or other variations in contour extending therefrom. It should be stressed, however, that one of the main functions of the base 3 is to prevent lateral movement of the windowpane 9 and cushion the edges thereof to prevent damage due to vibration. In some window configurations, the base member 3 may not necessarily contact the entire peripheral edge of the windowpane but it will still serve as a cushioning member to prevent damage to the glass. It will also be obvious that there may be some variations in contour of the window frame retaining lip 15 depending again upon the particular contour of the window frame with which the seal strip is used.

The various changes can be made in the illustrative embodiments shown herein without departing from the scope of the invention.

What is claimed is:

1. A sealing strip having an elongated elastomeric body portion of uniform cross section for mounting a windowpane in a window frame comprising.
   (A) an intermediate portion to be positioned between a window frame on the inner side and a windowpane on the outer side thereof,
   (B) a base portion integral with one edge of the intermediate portion, and
   (C) a resilient sealing lip integral with the intermediate portion and inclined at an acute angle to both the intermediate portion and the base portion,
   (D) both the sealing lip and the base portion extending laterally outwardly from the outer side of intermediate portion,
   (E) the sealing lip being bendable to permit it to fold inwardly toward the intermediate portion when a windowpane is placed in an assembled position against the seal strip,
   (F) the resiliency of the sealing lip causing it to maintain pressure against the inner surface of the windowpane along the marginal edge thereof and create a leak-proof seal therebetween, and
   (G) means on the outer side of the intermediate portion to prevent adhesion between the sealing lip and the intermediate portion.

2. A sealing strip as claimed in claim 1 wherein the means to prevent adhesion between the sealing lip and intermediate portion is a plurality of raised and depressed portions on the outer surface of the intermediate portion.

3. A sealing strip as claimed in claim 2 wherein the sealing lip extends outwardly from the edge of the intermediate portion opposite the base portion.

4. A sealing strip as claimed in claim 2 including a window frame engaging lip integral with the intermediate portion and spaced from the inner surface of the intermediate portion to form a window frame receiving channel therebetween.

5. A sealing strip as claimed in claim 2 wherein the sealing lip extends outwardly from the outer surface of the intermediate portion at the juncture of said intermediate portion and the base portion.

6. A sealing strip as claimed in claim 5 including a window frame engaging lip intergral with the intermediate portion and spaced from the inner surface of the intermediate portion to form a window frame receiving channel therebetween.

7. A sealing strip as claimed in claim 1 wherein the means to prevent adhesion between the sealing lip and the intermediate portion is an auxiliary integral lip located on the outer surface of the intermediate portion between the sealing lip and the base portion.

8. A window assembly for retaining a windowpane comprising the combination of:
  (A) a window frame defining an opening;
  (B) an elongated elastimeric strip of uniform cross section attached to the window frame and having;
    (1) an intermediate portion to be positioned between a window frame on the inner side and a windowpane on the outer side thereof,
    (2) a base portion integral with one edge of the intermediate portion, and
    (3) a resilient sealing lip integral with the intermediate portion and inclined at an acuate angle to both the intermediate portion and the base portion,
    (4) both the sealing lip and the base portion extending laterally outwardly from the outer side of intermediate portion,
    (5) the sealing lip being bendable to permit it to fold inwardly toward the intermediate portion when a windowpane is placed in an assembled position against the seal strip, and
    (6) the resiliency of the sealing lip causing it to maintain pressure against the inner surface of the windowpane along the marginal edge thereof and create a leakproof seal,
    (7) means on the outer side of the intermediate portion to prevent adhesion between the sealing lip and the intermediate portion; and
  (C) a trim strip attached to the window frame and bearing directly against the outer surface of the windowpane to hold it against the sealing lip thereby bending the lip inwardly and causing said lip to maintain sealing pressure against the inner surface of the windowpane.

9. A window frame assembly as claimed in claim 7 wherein the means to prevent adhesion between the sealing lip and the intermediate portion is a plurality of raised and depressed portions on the outer surface of the intermediate portion.

10. A window frame assembly as claimed in claim 8 wherein the means to prevent adhesion between the sealing lip and the intermediate portion is an auxiliary integral lip located on the outer surface of the intermediate portion between the sealing lip and the base portion.

11. A window frame assembly as claimed in claim 7 wherein the sealing lip is concavely curved when in the unstressed condition on the side contacting the windowpane.

References Cited

UNITED STATES PATENTS

| | | | |
|---|---|---|---|
| 2,642,632 | 6/1953 | Savage | 52—498 X |
| 2,667,951 | 2/1954 | Gall | 52—399 |
| 2,772,915 | 12/1956 | Renno | 52—400 X |
| 2,812,558 | 11/1957 | Lobanoff | 52—208 |
| 2,840,869 | 7/1958 | Fegan | 52—208 |
| 2,979,788 | 4/1961 | Richardson | 52—400 X |
| 2,939,243 | 7/1961 | Beauchamp | 49—498 |
| 3,338,015 | 8/1967 | Hoverman | 52—400 |
| 3,373,539 | 3/1968 | Meyer | 52—718 |

FOREIGN PATENTS 629,614  1/1963  Belgium.

ALFRED C. PERHAM, Primary Examiner

52—208, 628; 161—100